UNITED STATES PATENT OFFICE.

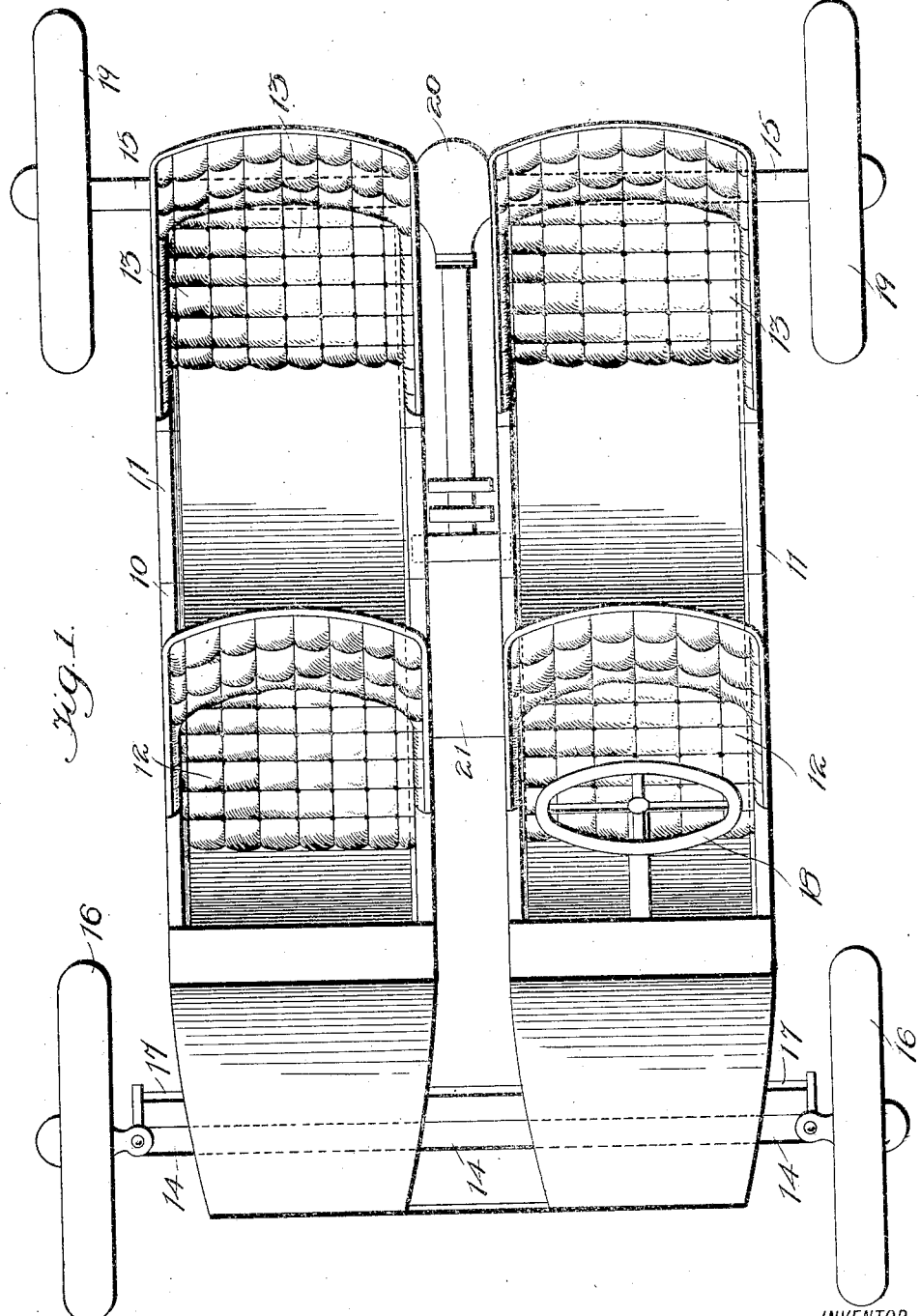

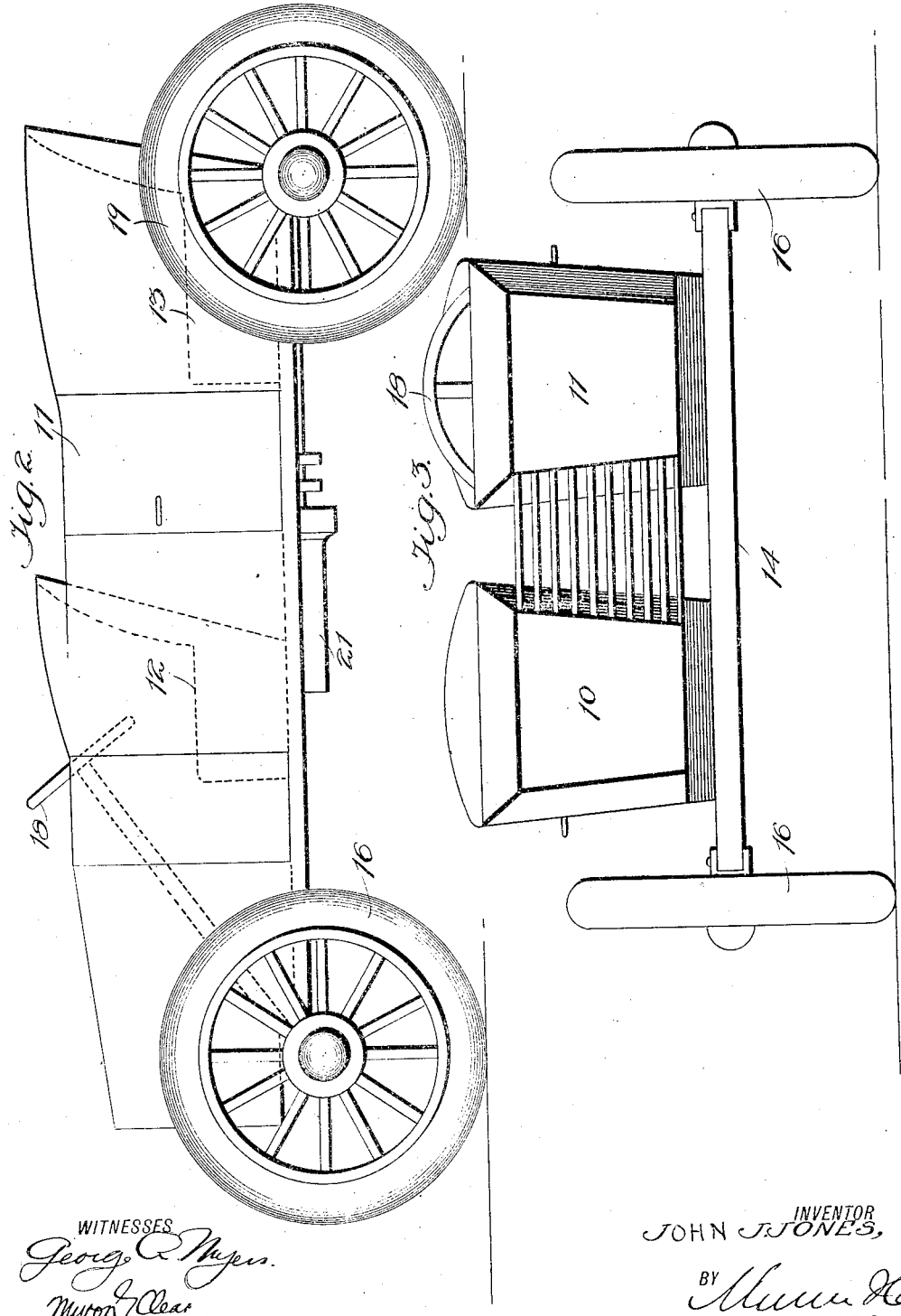

JOHN JAMES JONES, OF WICHITA, KANSAS.

AUTOMOBILE-BODY CONSTRUCTION.

1,352,066.  Specification of Letters Patent.  Patented Sept. 7, 1920.

Application filed November 5, 1918. Serial No. 261,246.

*To all whom it may concern:*

Be it known that I, JOHN JAMES JONES, a citizen of the United States, and a resident of Wichita, in the county of Sedgwick and State of Kansas, have invented certain new and useful Improvements in Automobile-Body Constructions, of which the following is a specification.

My present invention relates generally to automobiles, and more particularly to the class of small light vehicles including four wheeled frames but which are known as cycle cars by virtue of their ability to utilize to a considerable extent cycle parts in their makeup. This type of vehicle is distinguished for its minimum air resistance, its extremely light weight, and its low center of gravity increasing its tractive qualities, but is ordinarily limited to one or two passengers with a motor or motive parts inaccessible to the operator seated in the driver's seat.

It is the primary object of my invention to provide a body construction which will permit of accessible placement of the motive parts, a wide range or choice of transmission connections to the driving wheels, and the seating of four passengers comfortably without greatly increasing the weight of the frame and without necessitating elevation of the normally low center of gravity.

The accompanying drawings illustrate the body proposed by my invention for the accomplishment of the above objects and, referring to these drawings—

Figure 1 is a top plan view,

Fig. 2 is a side elevation, and

Fig. 3 is a front elevation.

Referring now to these figures, my invention proposes the mounting of a pair of laterally spaced parallel bodies 10 and 11, each of which has a forward seat 12 and a rear seat 13, these bodies being similarly mounted upon a four wheeled frame, parts of the latter of which appear at 14 and 15. The front wheels are shown at 16 and may either be mounted upon steering knuckles with the automobile type of steering connections 17, or the front axle may be swiveled at its center and turned on such swivel as in various types of cycle cars, in either instance under control of a steering post and wheel 18 located forwardly of the front seat 12 of the left hand body 11.

The rear wheels appear at 19 and their differential motion may be brought about either by differential gearing inclosed within the centrally disposed rear housing 20, or each wheel may have a hub clutch and be chain driven from a counter-shaft in turn connected to the driving parts.

Each of the bodies 10 and 11 may be of similar design and construction by so doing and it is obvious that their disposition permits of contiguous seating of four passengers as well as the location and disposition of the motor at 21 within the space between the bodies and within easy reach of the operator located within the forward seat of the body 11 or possibly his assistant located in the forward seat of the body 10.

No attempt has been made to show any specific form of transmision mechanism or any specific form of motor controls, as these features as well as the particular type of steering connections and connections for permitting differential movement of the rear wheels 19 will depend to a considerable extent upon the price at which the car is to be sold. In other words, low priced cars will necessarily have more simple and inexpensive connections in these several instances than the higher priced cars.

It is obvious however that my invention provides a distinctly novel design in so far as the structure of bodies is concerned and one which before all else permits comfortable seating of four passengers in an extremely light vehicle construction, each of the bodies being possibly of the weight of the ordinary motorcycle side car, without necessitating elevation of the desirable low center of gravity which makes up for the tractive qualities lost by the material reduction in weight as compared to that of an automobile.

Claims:

1. A motor car of the type described, including a four wheeled frame and a pair of laterally spaced substantially parallel bodies separated throughout their lengths with motive parts disposed between the bodies and accessible from either thereof.

2. A motor car of the type described, including a four wheeled frame and a pair of separate parallel bodies spaced apart throughout their lengths supported in the frame and each having front and rear seats as described.

3. A motor car of the type described, including a four wheeled frame, a pair of laterally spaced bodies supported by the frame and separated throughout their lengths each having a front and a rear seat, and a motor mounted in the space between the said bodies, all for the purpose described.

JOHN JAMES JONES.